United States Patent [19]

Kuroda et al.

[11] 4,080,838

[45] Mar. 28, 1978

[54] METHOD AND APPARATUS FOR CONTROLLING ULTRASONIC WAVES

[75] Inventors: Masao Kuroda, Tokyo; Toshio Kondo, Kunitachi; Sekijyuro Ono, Hachioji; Toshio Ogawa, Kokubunji, all of Japan

[73] Assignee: Hitachi Medical Corporation, Japan

[21] Appl. No.: 739,043

[22] Filed: Nov. 5, 1976

[30] Foreign Application Priority Data

Nov. 12, 1975 Japan ............................... 50-135082

Mar. 4, 1976 Japan ............................... 51-23543

[51] Int. Cl.$^2$ ............................... G01N 29/04

[52] U.S. Cl. ............................... 73/612; 340/1 R

[58] Field of Search ............... 73/67.9, 67.8 S, 67.8 R, 73/67.7, 67.5 R; 340/1 R, 3 R, 5 R, 5 MP

[56] References Cited

U.S. PATENT DOCUMENTS

| | | | |
|---|---|---|---|
| 3,881,164 | 4/1975 | Kossoff | 73/67.8 S |
| 3,918,024 | 11/1975 | Macovski | 73/67.9 |
| 3,919,683 | 11/1975 | Itamura et al. | 73/67.8 S |
| 4,005,382 | 1/1977 | Beaver | 340/1 R |

*Primary Examiner*—Richard C. Queisser

*Assistant Examiner*—Stephen A. Kreitman

*Attorney, Agent, or Firm*—Craig & Antonelli

[57] ABSTRACT

In a method for controlling ultrasonic waves wherein a plurality of elements constituting a phased array ultrasonic transducer are driven with desired delay times, the improvement therein comprising the fact that when values obtained by quantizing the delay times by a predetermined time are different between the adjacent elements, the ultrasonic waves are radiated with a delay of time corresponding to the difference.

4 Claims, 13 Drawing Figures

METHOD AND APPARATUS FOR CONTROLLING ULTRASONIC WAVES

BACKGROUND OF THE INVENTION

There has been extensively employed for various diagnoses an ultrasonic diagnostic equipment with which a subject is irradiated by an ultrasonic beam and an echo thereof is indicated by modulating the brightness of a cathode ray tube or the like so as to obtain an ultrasonic tomogram.

This invention relates to a method and apparatus for controlling ultrasonic waves which are radiated from or received by a phased array ultrasonic transducer for the electronic scanning of the ultrasonic beam employed in the ultrasonic diagnostic equipment or the like.

In order to deflect the ultrasonic beam, there has heretofore been used a method in which a plurality of transducer elements put into an array are respectively endowed with differences in the time of a driving pulse voltage.

FIG. 1(*a*) shows the state of ultrasonic waves in the case where $n$ $(1 - n)$ elements rectilinearly arrayed are driven at the same time. The main beam of the ultrasonic waves exists orthogonally to the direction of array.

In case of FIG. 1(*b*), the elements $1 - n$ are driven by bestowing delay times $\tau_1 - \tau_n (\tau_n = d_n/V$, V: the velocity of sound in a medium to-be-observed) on the respective elements so that the wave fronts of sound waves may become in-phase at distances $d_1 - d_n$. In this case, the main beam of the ultrasonic waves lies in a place deflected by an angle $\theta$, $\theta = \sin^{-1}(V \cdot \tau_n / l)$ ($l$: the total length of the array ultrasonic transducer).

Likewise, when $d_1 < d_n$ $(\tau_1 < \tau_n)$, the main beam of the ultrasonic waves is deflected by $-\theta$ as shown in FIG. 1(*c*).

As described above, the deflection of the main ultrasonic beam can be caused by driving the respective elements of the phased array ultrasonic transducer with appropriate delay times. Similarly, receiving waves can be endowed with directivity by bestowing appropriate delay times on received signals from the respective elements and adding them on the side of receiving the ultrasonic waves.

An example of a prior-art circuit for bestowing the appropriate delay times on the transmitting or received signals is shown in FIG. 2. Since the illustrated circuit is generally employed for the reception, the case of the reception will be explained here. Electric signals which are generated from $n$ elements by incident ultrasonic waves $\tau_i$ are delayed by variable delay circuits $\mathbf{1}_n - \mathbf{1}_n$ and then added by adders $\mathbf{2}_1 - \mathbf{2}_n$ connected between the adjacent ones of the elements, and are thereby endowed with directivity.

Assuming now that the elements are arrayed at equal intervals, $\tau_1 = \tau_2 = \ldots = \tau_n \equiv \tau$. As the delay times of the elements, a value which is obtained by equally dividing the maximum delay time necessary for a desired angle of deflection by a value being smaller by one than the total number of the elements is given between the adjacent elements. Therefore, a single control signal suffices for the delay times.

Letting $\Delta$ denote the gap between the respectively adjacent elements and $\theta$ denote the angle of deflection, the delay time $\tau$ is given by Eq. (1):

$$\tau = (\Delta \cdot \sin \theta / V) \qquad (1)$$

where V represents the velocity of sound in the medium. By way of example, if the gap $\Delta$ between the elements is 0.5 mm, the angle of deflection $\theta$ is 45° and the velocity of sound in the medium V is 1,500 m/sec in Eq. (1), then the delay time $\tau$ becomes 236 ns. Assuming now that $\theta$ is scanned at every 0.5°, $\tau$ need be changed at every 2 - 3 ns. However, when the elements adopted have a natural frequency of, for example, about 2 MHz, one wavelength corresponds to 500 ns, and it is practically meaningless to perform the phasing at such accuracy better than about 1%.

If, in this manner, the delay times are controlled by merely prescribing the accuracy of the phasing and quantizing the delay times, the above-mentioned condition $\tau_1 = \tau_2 = \ldots = \tau_n$ is no longer satisfied, and the single control signal for the delay times becomes insufficient. Therefore, the control becomes complicated.

SUMMARY OF THE INVENTION

An object of this invention is to provide a novel control method and apparatus which eliminate the difficulty of the prior-art control method described above and which can easily carry out the control of the delay times to be bestowed on the respective elements of the phased array ultrasonic transducer.

In order to accomplish the object, this invention adopts a method wherein delay times required for the respective elements in order to endow the phased array ultrasonic transducer with directivity at a desired angle are quantized by a certain predetermined time, and when the quantized values have a difference between the adjacent elements, the delay time between the elements is controlled on the basis of the difference between the quantized quantities of delays. More specifically, the whole delay time $\tau$ is equally distributed by the number $(N - 1)$ of the intervals of the adjoining elements in advance, and the value thus obtained is quantized by a delay time $\tau_o$. In other words, the quantized delay times $\tau_i$ are indicated by:

$$\tau_i = [(\tau \cdot i/N - 1)/\tau_o]$$

$$(I = 0, 1, 2, \ldots, N-1)$$

where $$\tau = l/V \sin \theta$$

($\theta$: angle of deflection,
$l$: array length,
$V$: velocity of sound), and
[ ]represents to round off digits below the decimal point.

Subsequently, the differences of the quantized delay times between the adjacent elements, $\tau_{i+1} - \tau_i$ ($i = \mathbf{0}$, 1, 2, . . . , N $-$ 1) are evaluated. Delay times corresponding to the values are bestowed on the ultrasonic waves.

In this case, in the present invention, it is desirable for simplification of the apparatus to calculate the angle of deflection of the ultrasonic waves in a range in which the values of the differences of the quantized delay times between the adjacent elements become 1 (one) and 0 (zero).

DESCRIPTION OF THE PREFERRED EMBODIMENTS

Figure 1A:
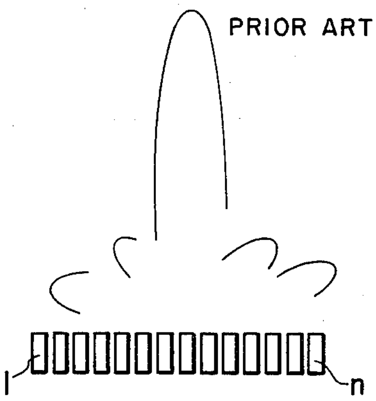
FIG. 1(a) PRIOR ART
FIGS. 1(*a*), 1(*b*), and 1(*c*) are directivity diagrams of a phased array ultrasonic transducer.
Figure 1B:
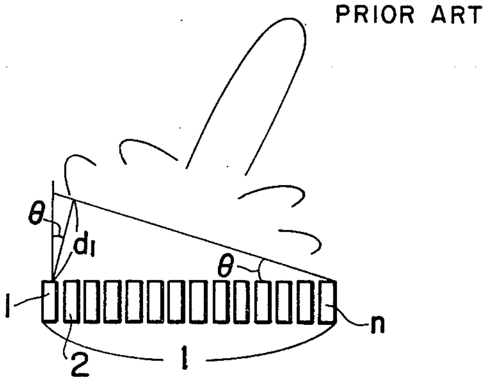
FIG. 1(b) PRIOR ART
Figure 1C:
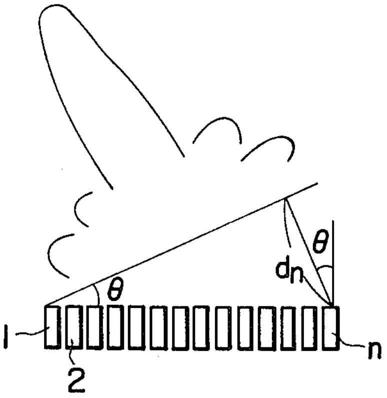
FIG. 1(c) PRIOR ART

The principle of this invention will be described by taking as an example the case where the value of the difference of the quantized delay times between the adjacent elements is 1 or 0. This is because, in the case where the value of the difference is 1 or 0, simplification of the apparatus according to this invention (for example, the fact that the memory capacity may be small) is achieved. When the angle of deflection exceeds a certain value, the value of the difference can become an integer of 2 or greater, but it is a matter of course that a delay time corresponding to this value of the difference can be bestowed on the ultrasonic waves.

Letting $\tau_\theta$ denote the delay time between the adjacent elements at the time when the angle of deflection $\theta$ is endowed with directivity, $\tau_o$ the quantization value, and N the total number of the elements, consider as set $M_\theta(i)$ of the values of the differences.

At this time, the initial value of $n$ (positive integers) is made 1, and $M_\theta(i)$ is put to be equal to 1 or 0 ($i = 1 - N$). Under these conditions, while changing $i = 1, 2, 3, \ldots N$, the values of $i$ which satisfy the following equation (2) are found:

$$((\tau_\theta/\tau_o)\, i - n) > 0 \quad (2)$$

At this time, each time $i$ satisfies Eq. (2), it is put that $M_\theta(i) = 1$, and the value of $n$ is increased by 1. Thus, all the values of $i$ fulfilling Eq. (2) are found in succession. In this way, a series of $M_\theta(i)$'s of "1" or "0" is fully calculated under the condition of $\tau_\theta < \tau_o$ as to the angle of deflection $\theta$ for scanning. Hereinbelow, $M_\theta(i)$ evaluated under $\tau_\theta < \tau_o$ shall be termed the "quantized difference code."

By way of example, consider a case where the number of elements is 32, the gap Δ between the elements is 0.5 mm, the velocity of sound in the medium is 1,500 m/sec and the quantization value of 50 nsec. In case of $\theta = 0°$, $M_\theta(i)$'s for $i = 1 - 32$ becomes 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0. In case of $\theta = 4.3°$, $M_\theta(i)$'s for $i = 1 - 32$ become 0, 0, 1, 0, 1, 0, 1, 0, 1, 0, 1, 0, 1, 0, 1, 0, 1, 0, 1, 0, 1, 0, 1, 0, 1, 0, 1, 0, 1, 0, 1, 0. In case of $\theta = 8.6°$, $M_\theta(i)$'s for $i = 1 - 32$ become 0, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1.

When the quantized difference codes $M_\theta(i)$'s thus evaluated for all the angles of deflections $\theta$ fulfilling $\tau_\theta < \tau_o$ are used for the control of the delay times of the respective elements, the control can be greatly simplified.

Hereunder, the method of the control of the delay times of the respective elements will be described with reference to FIG. 3.

Figure 2:
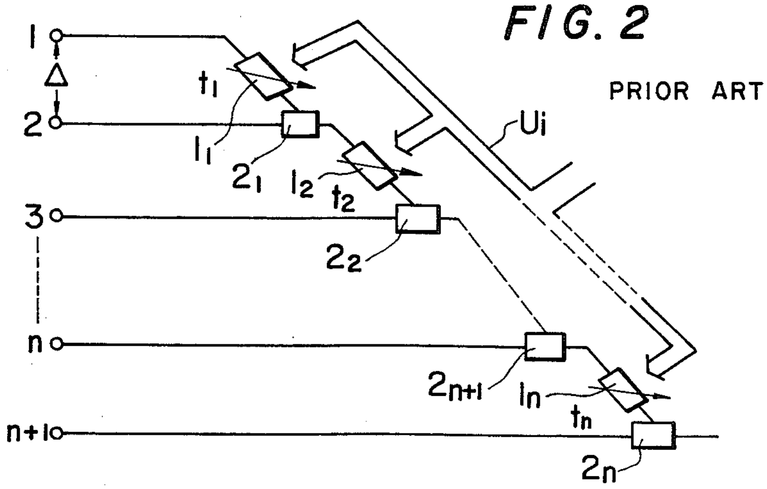
FIG. 2 PRIOR ART
FIG. 2 is a block diagram showing the construction of ultrasonic wave control apparatus which has hitherto been employed.
Figure 3:
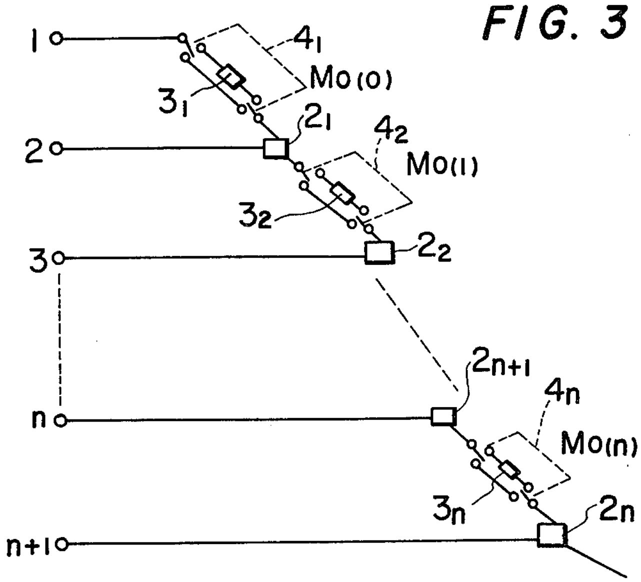
FIG. 3 is a block diagram for explaining the method for controlling ultrasonic waves according to this invention.

Apparatus shown in FIG. 3 is such that, in the prior-art apparatus shown in FIG. 2, delay circuits $3_1 - 3_n$ each having a delay time $\tau_o$ and switches $4_1 - 4_n$ are inserted between the respectively adjacent elements. As in FIG. 2, the elements are connected in series by the adders $2_1 - 2_n$.

Under such construction, the presence or absence of the delay quantities between the respectively adjacent elements is realized through the switches $4_1 - 4_n$ in conformity with the series of $M_\theta(i)$'s ($i = 1 - N$) corresponding to the desired angle of deflection $\theta$ previously mentioned. That is, it is executed according to $M_\theta(i)$'s to establish the delay times between the ultrasonic waves to be received by the respectively adjacent elements. For example, if $M_\theta(i) = 1$ at $i = 1$, the switch $4_2$ is connected onto the side of the delay circuit $3_2$, and the ultrasonic waves to be received by the element 2 are endowed with the delay time $\tau_o$.

Assuming by way of example that the quantization value is selected to be 50 ns, that the gap Δ between the elements is 0.5 mm and that the velocity of sound V in the medium is 1,500 m/sec, it is possible in the embodiment of FIG. 3 to deflect $\theta$ up to 8.6° at every 0.27°.

In the case of the prior art illustrated in FIG. 2, the variable delay circuit which employs an LC delay line of 50 ns having 17 - 25 control terminals in order to realize variations of every 2 - 3 ns is required between the adjacent elements. In contrast, according to this invention, the apparatus can be constructed of the fixed delay circuit of 50 ns between the adjacent elements and a small number of control signals. For example, when the maximum deflection angle is 8.6° as stated above, the control signal may be of the 1-bit signal of "1" or "0." Accordingly, the invention can sharply simplify the construction of the apparatus as compared with the prior-art method.

In this invention, in case of receiving ultrasonic waves from a direction of 40° - 50° in terms of the maximum deflection angle, $M_\theta(i)$'s may be evaluated also as to the case where the difference is 2 or greater as stated previously. As a more effective method, however, only the quantized difference codes can be employed, and a block diagram of such an embodiment is shown in FIG. 4.

The fundamental of data to be controlled in the present embodiment may be the quantized difference code itself having the value "0" or "1." Because, at $\tau_\theta \geqq \tau_o$, the integral part of $\tau_\theta/\tau_o$ is common among all the elements within a certain angular range, and the decimal part thereof has been evaluated by the quantized difference code.

In this case, accordingly, $\tau_{\theta max}/\tau_o$ (digits below the decimal point are rounded up) variable delay circuits $5_1 - 5_n$ (where $\tau_{\theta max}$ denotes the maximum delay quantity) are interposed between the respectively adjacent elements. Assuming by way of example that $\tau_{\theta max} = 236$ ns and that $\tau_o = 50$ ns, variable delay circuits whose number of tap terminals is 5 and whose maximum delay time is 250 ns may be employed as the variable delay circuits $5_1 - 5_n$.

Figure 4:
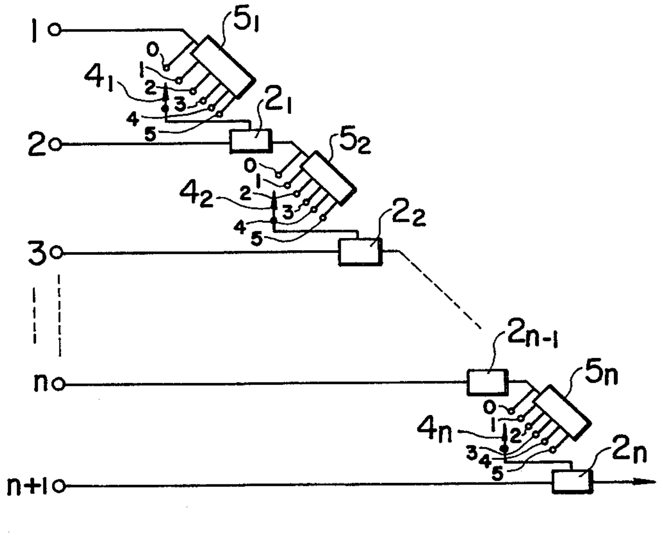
FIGS. 4, 5 and 6 are block diagrams showing an embodiment of the apparatus for controlling ultrasonic waves according to this invention.

In FIG. 4, the same or equivalent parts as in FIG. 3 are indicated by the same symbols. The taps of each of the variable delay circuits $5_1 - 5_n$ are indicated by numerals 1 - 5, and the tap of greater numeral has a longer delay time. Tap 0 has no delay, and tap 5 exhibits the greatest delay time 250 ns. The selection of such taps 0 - 5 is effected by the switches $4_1$ - $4_n$ connected to input terminals of the adders $2_1$ - $2_n$. Description will now be made of the selection of the taps 0 - 5 by the switches $4_1$ - $4_n$.

$M_\theta(i)$ ($i = 1 - N$) is derived as an output from the quantized difference code stored in a memory such as read only memory, by accessing the address of the memory corresponding to a certain deflection angle $\theta$. The integral part of $\tau_\theta/\tau_o$ (digits below the decimal point are round off) is added to the output under the condition under which it is common to all the elements. The resultant value is made tap terminal No. Thus, the delay time of the variable delay circuit between the elements is controlled. In order to determine the address of the memory, a parallel output of a counter for oscillation pulses of a main oscillator of the apparatus may be employed.

Figure 5:
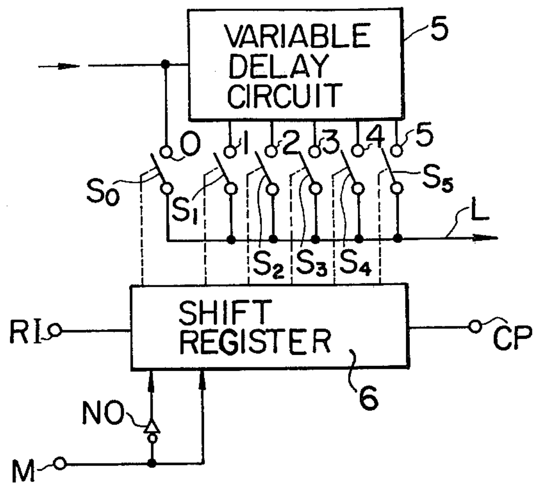

FIG. 5 shows a block diagram for realizing the tap selection. Referring to the figure, numeral 5 designates the variable delay circuit, the letter L indicates an output line in which an output from the variable delay circuit 5 is produced. The taps O and 1 - 5 of the variable delay circuit 5 are connected to the output line L through switches S0 - S5, respectively. Shown at 6 is a 6-bit shift register. RI denotes a serial input terminal, CP a terminal for applying clock pulses, M an input terminal of the 1-bit signal of $M_\theta(i)$, and N0 a "not" circuit. With such construction, the 1-bit signal of $M_\theta(i)$ for the decimal part of $\tau_\theta/\tau_o$ corresponding to the desired deflection angle $\theta$ is preset in the shift register 6 through the terminal M. Thereafter, the serial input terminal RI is made the zero potential or is grounded, and clock pulses amounting to $\tau_\theta/\tau o$ with the digits below the decimal point rounded off are applied to the terminal CP. Regarding a method for obtaining $\tau_\theta/\tau_o$ clock pulses, it is needless to say that they can be simply obtained by, for example, using the parallel outputs of the aforecited counter above a predetermined bit.

The switches S0 - S5 are controlled by respective outputs of the shift register 6 obtained by such operation. By performing the tap selection in this manner, a signal which is obtained at the final stage the sum of the received signals of the respective elements as added in the same phase. The number of bits of the shift register 6 is set at a value which is obtained by adding 1 to the value of $\tau_{\theta max}/\tau_o$ with the digits below the decimal point rounded up.

As explained above, with the control method according to this invention, the delay quantities are quantized, whereby the amount of variation of the variable delay circuits is reduced and besides the control thereof can be facilitated, so that a sharp simplification of the ultrasonic wave control apparatus becomes possible.

In the above, description has been made of the method for controlling the ultrasonic waves which are received by the phased array ultrasonic transducer. Now, an embodiment of the control method in the case of radiating ultrasonic waves by the use of the quantized difference code evaluated will be described with reference to a block diagram of FIG. 6.

Figure 6:
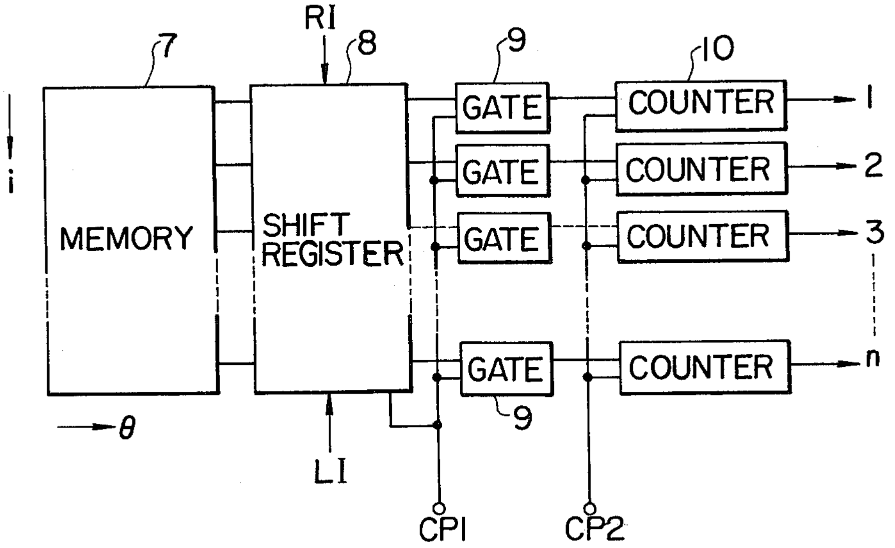

In FIG. 6, numeral 7 designates a memory, and numeral 8 an $n$-bit shift register (bidirectional shift register). RI indicates one serial input terminal of the shift register 8, while LI the other serial input terminal thereof. Numeral 9 represents each gate, one input of which is an output from the shift register 8. Numeral 10 denotes each up-down counter, one input of which is an output from the corresponding gate 9. Shown at $1 - n$ are elements to which outputs of the respective up-down counters 10 are applied. CP1 indicates a clock pulse terminal, and CP2 a pulse input terminal. The operation of driving the respective elements in such construction will be explained.

Considering first the case where $\tau_\theta < \tau_o$, the quantized difference codes are stored in the memory 7 in advance, and when the desired angle of deflection $\theta$ is to be obtained, $M_\theta(i)$ ($i = 1 - N$) is selected in such a way that, as in the case of the control of the received waves, the address of the memory corresponding to the deflection angle $\theta$ is accessed. Subsequently, the values of $M_\theta(i)$ are given to the preset inputs of the presettable $n$-bit shift register 8. The respective outputs of the shift register are applied to the corresponding gate circuits 9 as the one-side inputs thereof. The gate circuits gate the clock pulses of the up-down counters 10.

Pulses $P_1$ applied through the clock pulse applying terminal $CP_1$ as become the clock pulses of the counters 10 are made identical to the shift pulses of the shift register 8. At first, the serial inputs of the shift register 8 are made "0" through the serial input terminal RI. Although a clear terminal is omitted in FIG. 6, it makes the contents of all the counters 10 zero and presets the desired $M_\theta(i)$ of the memory in the shift register 8 as the initial state.

When, under this initial state, $m$ clock pulses $P_1$ equal in number to the elements are impressed, the contents of the $j$-th counter 10 become $$(CT_j) = \sum_{I=1}^{j} M_\theta(I).$$

This represents the state in which the contents of the counters 10 are quantized by $\tau_o$ and are proportionally distributed to $CT_1$ - $CT_m$.

After such proportionally distributed quantities are accumulated in the counters 10, an identical substration (addition) pulse $P_2$ is applied through the terminal $CP_2$ to the respective counters when driving the elements. By putting the borrow (carry) of each counter the driving pulse, the main beam of the ultrasonic waves can be deflected in the arbitrary deflection angle $\theta$.

Now, consider the case where the angle of deflection is under the condition of $\tau_\theta \geqq \tau_o$. In this case, the operation of making the serial inputs of the shift register 8 "1" through the serial input terminal LI and impressing $m$ clock pulses in the reverse shifting direction may be repeated besides the foregoing method and by an integral number of times equivalent to $\tau_\theta/\sigma_o$ with the digits after the decimal point ignored. The maximum bit number of the up-down counters 10 is set at $(\tau_{\theta max}/\tau_o) \times m$.

In the above embodiment, description has been made of the case of deflecting the main ultrasonic beam in the $\theta$ direction. In case of deflecting it in the $-\theta$ direction, at the transmission, the shifting direction of the shift register 8 in FIG. 6 by the shift pulses may be reversed, and at the reception, change-over switches may be provided at stages before applying the outputs of the respective elements in FIG. 4 to the adders $2_1$ - $2_n$ as inputs thereof.

In the embodiments of this invention described above, description has been made of the case of calculating the quantized difference codes and storing them in the memory in advance. However, a construction is also possible in which the quantized difference codes corresponding to the desired deflection angle $\theta$ are calculated each time and in which the delay times are directly controlled with the calculated values.

As set forth above in detail, according to this invention, the control terminals of the variable delay circuits can be sharply reduced without degrading the resolving power, and the ultrasonic control apparatus which is simpler in construction than the prior-art apparatus can be obtained. By evaluating the quantized difference codes of $M_{\theta}(i)$ within the range of $\tau_\theta < \tau_o$ in advance, the ultrasonic transducer can be easily controlled by a small memory capacity. This is greatly effective in constructing a system, and is very significant in industry.

This invention has thus far been stated on the method and apparatus in which the delay times to be bestowed on the ultrasonic waves are controlled on the basis of the values of the differences of the quantized delay times as arise between the respectively adjacent elements. Since, in the method, the delay times between the respectively adjacent elements are added in succession, disadvantages to be stated below occur in some cases.

Firstly, the amplitude characteristics of every delay time of one variable delay circuit is multiplied (N − 1) times (N: the number of elements), so that the performance is degraded. By way of example, when one variable delay circuit exhibits an amplitude decrease of 5%, the resultant amplitude decreases to $(0.95)^{\neq}\times 100 =$ 44% at N = 16. Apparently, this is equivalent to the fact that the respective received signals are weighted and added. Although a weight of 100 — about 70% has no influence on the directivity characteristic of the receiving system, a weight of below 70% increases the main beam width defined with the half value and therefore degrades the resolution.

Secondly, the fixed delay times of the variable delay circuits and the adders are added in succession, so that a delay circuit for compensation is required in order to obtain a deflection angle in the zero direction.

The delay time for compensation $CT_i$ ($i$ = 2, 3, . . . , N) is given by:

$$CT_i = (i - 1)\, t_1 + (i - 2)t_2$$

where $t_1$: fixed delay time of the variable delay circuit, $t_2$: fixed delay time of the adder.

For example, $t_1$ = 5 ns, and $t_2$ = 10 ns. At N = 30, the maximum delay time for compensation becomes $CT_{30}$ = 425 ns.

For this reason, in case of the reception, the delay circuit for compensation having a comparatively great delay time comes to be required.

In consideration of such point, this invention can also enhance the receiving characteristic by arranging a plurality of elements for reception in parallel.

Figure 7:
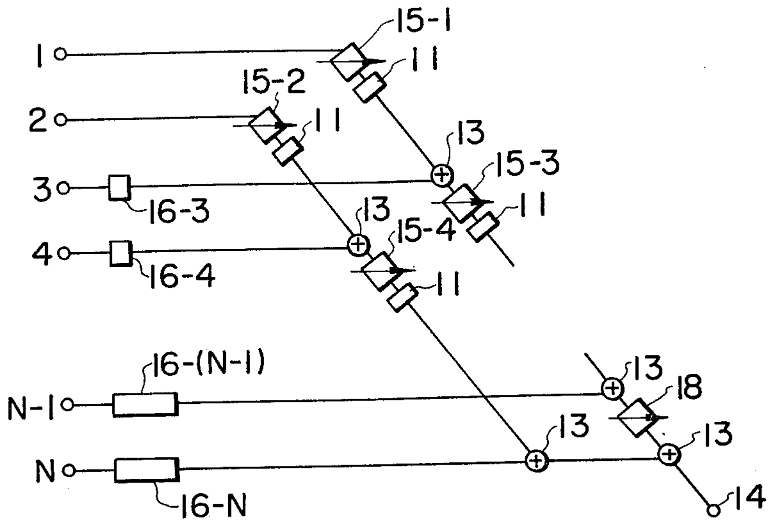
FIG. 7 is a block diagram for explaining another method for controlling ultrasonic waves according to this invention.

FIG. 7 is a block diagram for explaining an embodiment of this invention in the case where the plurality of elements are arranged in parallel. For the sake of simplicity of the explanation, FIG. 7 illustrates a case where the number N of the elements is even. There will be described a method wherein N/2 elements of odd Nos. and N/2 elements of even Nos. are arranged in parallel and wherein the respective terminal outputs are added after phasing. Referring to the figure, numeral 11 designates amplifiers for compensation. 15-1 to 15-(N − 1) indicate variable delay circuits. One group of variable delay circuits (15-1, 15-3, . . . ) and the other group of variable delay circuits (15-2, 15-4, . . . ) are controlled by the same quantized difference codes. 16-3 to 16-N indicate delay circuits for compensation. The delay circuits for compensation 16−$i$ and 16−($i$ + 1) ($i$ = 3 to (N − 1)) have equal delay times. The delay time of the delay circuit for compensation 16-N may be ½ as compared with that in the previous case. Numeral 13 denotes adders by which outputs of the two sorts of delay circuits are added. Numeral 18 represents another variable delay circuit, which controls a delay time $\tau$ at a deflection angle $\theta$ so as to become:

$$\tau = d/V \sin \theta$$

where $P_1$ $d$: element interval. Shown at 14 is an output terminal.

According to such construction, the addition outputs of the N/2 variable delay circuits (15-1, 15-3, . . .) and the addition outputs of the N/2 variable delay circuits (15-2, 15-4, . . .) are phased by the variable delay circuit 18 and are delivered as an output from the terminal 14.

The amplifiers 11 serve to compensate for attenuations attributed to the delay circuits 15-1 to 15-(N − 1), and they may be employed if necessary.

Figure 8:
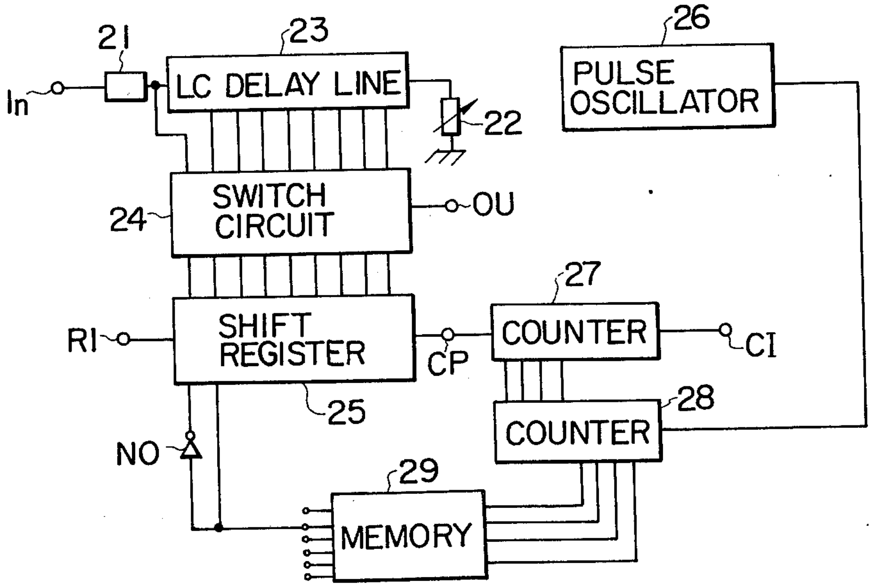
FIGS. 8 and 9 are block diagrams showing a variable delay circuit and a control device therefor shown in FIG. 7, respectively, and FIGS. 10(*a*) and 10(*b*) are block diagrams for explaining still another method for controlling ultrasonic waves according to this invention.

FIG. 8 is a block diagram showing an example of the variable delay circuit 15 in FIG. 7 and means for controlling it. Referring to the figure, the variable delay circuit 15 is composed of an LC delay line with eight taps 23 whose maximum delay time is, for example, 400 ns, impedance matching resistances 21 and 22, a switch circuit 24, and an 8-bit shift register 25. In designates an input terminal to which an output from the variable delay circuit 15 at the preceding stage is applied. The switch circuit 24 switches the taps of the LC delay line 23. Ou designates an output terminal from which an output from the LC delay line as obtained through the switch circuit 24 is applied to the variable delay circuit at the succeeding stage. Numeral 26 denotes a pulse oscillator, numerals 27 and 28 counters, numeral 29 a memory, symbol NO a "not" circuit, symbol RI a serial input terminal of the shift register 25, symbol CP a terminal for applying clock pulses of the shift register 25, and symbol Cl a terminal for applying clock pulses of the counter 27. In such construction, the quantized difference codes previously stated are stored in the memory 29 as to respective deflection angles. Oscillation pulses of the oscillator 26 are counted by the counter 28, the quantized difference codes corresponding to a predetermined angle are read out in accordance with the contents thereof, and they become delay time control signals of the individual variable delay circuits. More specificially, first of all, the quantized difference codes corresponding to the predetermined angle are preset in the shift register 25. Thereafter, the serial input terminal RI is grounded, and clock pulses amounting to $\tau_\theta/\tau_o$ (with the digits after the decimal point rounded off) are impressed on the terminal CP. As regards $\tau_\theta/\tau_o$, the contents of the counter 28 above a predetermined bit are supplied to the counter 27, and the serial outputs of the counter 27 are applied to the terminal CP. At this time, the clock pulses are applied to the terminal Cl, and the contents of the counter 27 are applied to the terminal CP.

The switch circuit 24 is controlled by the respective outputs of the shift register thus obtained. Owing to the adoption of such construction, the variable delay circuits 15-1 and 15-2, 15-3 and 15-4, . . . , and 15-($n$ − 1)

and 15-*n* in FIG. 7 can be controlled by the same quantized difference codes, respectively.

Figure 9:
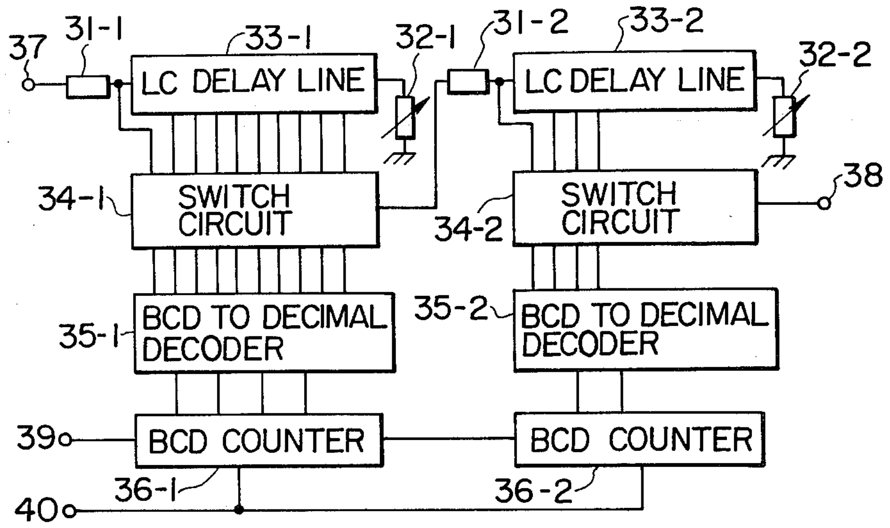

FIG. 9 is a block diagram which illustrates the construction of an embodiment of the variable delay circuit 18 shown in FIG. 7. In the figure, 33-1 designates an LC delay line with ten taps whose maximum delay time is, for example, 50 ns; 33-2 an LC delay line with three taps whose maximum delay time is, for example, 150 ns; 34-1 and 34-2 switch circuits having ten and four switches, respectively; 31-1, 31-2, 32-1 and 32-2 resistors for impedance matching; 35-1 and 35-2 BCD (binary coded decimal) to Decimal decoders; 36-1 and 36-2 BCD (binary coded decimal) counters; 37 a signal input terminal; 38 a signal output terminal; 39 an input terminal of the BCD counter 36-1; and 40 a reset terminal.

With such construction, the BCD counters 36-1 and 36-2 are reset by a control signal entered from the terminal 40. Thereafter, the BCD counters 36-1 and 36-2 count up by control signals from the terminal 39. The contents of the BCD counters 36-1 and 36-2 are respectively converted into decimal numbers by the BCD to Decimal decoders 35-1 and 35-2, and one gate of each of the switch circuits 34-1 and 34-2 falls into the "on" state. The signal entered from the terminal 37 has its amplitude halved by the matching resistor 31-1, it is delayed at a step or steps of 50 ns/10 = 5 ns by the LC delay line 33-1, and it is thereafter entered via the switch circuit 34-1 into the matching resistor 31-2 at the succeeding stage. Likewise, the input signal of the matching resistor 31-2 has its amplitude halved, it is delayed at a step or steps of 150 ns/3 = 50 ns by the LC delay line 33-2, and it is thereafter delivered via the switch circuit 34-2 to the output terminal 38. Although the amplitude of the input signal becomes ¼ here, it can be compensated by providing behind the output terminal 38 an amplifier which quadruples the amplitude. In this way, delay times of 40 steps can be realized through the control signals.

In the foregoing embodiment, description has been made of the case where the number of elements N is even. In case where N is odd, the variable delay circuits may be divided into two groups respectively consisting of N − 1/2 circuits and (N − 1/2 + 1) circuits, and the outputs of the groups may be added after phasing.

In the present embodiment, the variable delay time between every second elements is controlled. Obviously, however, it is also effective that among M × N (M, N: integers) elements arranged in the form of an array, every M-th (M = 3, 4, . . . ) N elements are controlled by the same quantized difference code, whereupon the respective outputs of M groups are added after phasing. At this time, the respective outputs of the M groups which are controlled by the same quantized difference code have the delay time $\tau$ of the foregoing equation dependent upon the element interval $d$ and the deflection signal $\theta$. As a method for the phasing, therefore, there is one to be explained in connection with a block diagram of FIG. 10(*a*). Symbols 50-1 to 50-M indicate the M groups which are controlled by the same quantized difference code, and each of which is composed of N elements. Symbols 51-1 to 51-(M − 1) indicate variable delay circuits, which are controlled by a single control signal so as to establish the aforecited delay time $\tau$. Numeral 52 designate adders, and numeral 53 an output terminal.

Figure 10A:
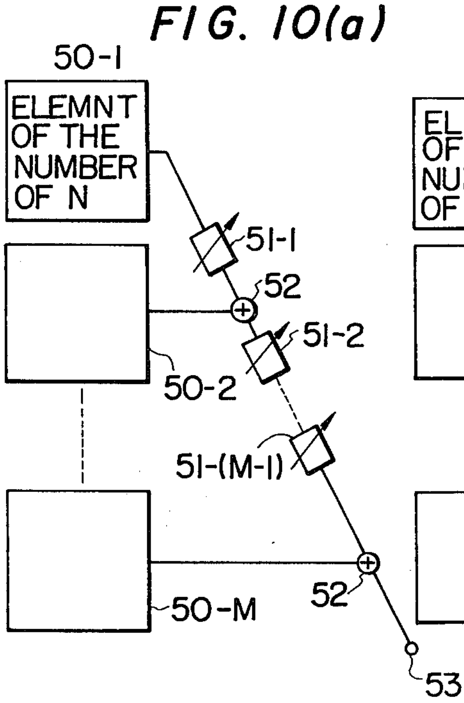
Figure 10B:
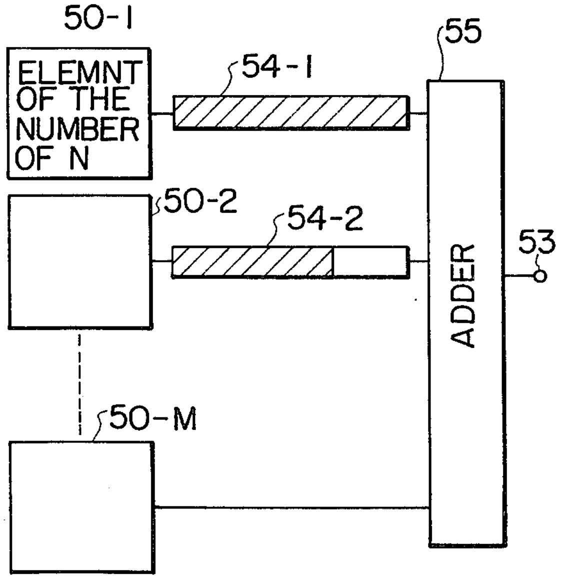

It is to be understood that the control may well be made by a parallel system as shown in FIG. 10(*b*). Here, symbols 54-1 to 54-(M − 1) denote variable delay circuits, and numeral 55 an adder. In this case, the delay time $\tau$ for the phasing need be formed by the use of, for example, the circuit arrangement in FIG. 8.

In this manner, the invention is greatly effective in preventing the degradation of the performance ascribable to the decrease of the amplitude at every delay time in the receiving wave-deflecting system and also the increase of the delay time of the delay circuit for compensation.

A further advantage is that the control signals at the time when the variable delay circuits are controlled by the quantized difference codes are simplified to the extent of putting them in parallel.

Another advantage is that labors for circuit adjustments are sharply reduced.

We claim:

1. A method for controlling ultrasonic waves wherein by the use of a plurality of arrayed ultrasonic transducer elements, ultrasonic waves are transmitted or received with predetermined delay times, comprising the steps of:

quantizing said delay times by a predetermined delay time, and delaying the ultrasonic waves by a delay time corresponding to a value of the difference of the quantized delay times between adjacent elements so as to bestow this delay time on the ultrasonic waves which are transmitted or received between said adjacent elements, the ultrasonic waves being transmitted or received with directivity at a predetermined deflection angle.

2. The method for controlling ultrasonic waves according to claim 1, wherein the delay time corresponding to the difference of the quantized delay times between adjacent elements is bestowed on the ultrasonic waves within a deflection angle in which the difference of the quantized values become only "1" and "0."

3. Apparatus for controlling ultrasonic waves in conjunction with a plurality of arrayed ultrasonic transducer elements so as to radiate ultrasonic waves at a predetermined deflection angle, comprising:

memory means for storing difference values for all of the transducer elements which effect radiation within the predetermined deflection angle, the difference values designating the delay times to be bestowed on the ultrasonic waves as quantized by a predetermined time between the adjacent ones of said elements and being designated "1" or "0,"

an *n*-bit shift register connected to said memory means in which said values corresponding to the desired deflection angle are preset as parallel outputs,

*n* up-down counters receiving the parallel outputs of said shift register, and gate means for selectively connecting the outputs of said shift register to respective up-down counters, said elements being driven by output pulses which are obtained by applying an identical pulse to said *n* up-down counters after completion of *n* shifts of said shift register, thereby to control the delay in radiation of the ultrasonic waves.

4. Apparatus for controlling ultrasonic waves wherein delay times of the ultrasonic waves to be received by M × N (M, N: integers) transducer elements arrayed are controlled, comprising:

a plurality of transducer elements which are arranged in advance to select every (M − 1)-th N receiving signals among M × N receiving signals, receiving means for delaying the receiving signals, and consisting of (N − 1) first variable delay means and (N − 1) first addition means whose inputs are connected to the outputs of said variable delay means, M such receiving means being arranged in parallel, said first variable delay means being controlled by difference values obtained between the respectively adjacent ones of said elements relating to delay quantities which are obtained by quantizing by a predetermined time the times into which a required maximum delay time determined by a deflection angle among the N receiving signals is equally distributed by integers (N = 1), (M − 1) second variable delay means whose inputs are connected to receive the outputs from said receiving means, and second addition means whose inputs are connected to receive the outputs from said second variable delay means, outputs of said M receiving means being added after phasing, thereby to control the delay times of said M × N receiving signals.

* * * * *